Patented Sept. 30, 1952

2,612,503

UNITED STATES PATENT OFFICE 2,612,503

BASIC ETHER-SUBSTITUTED ISOQUINOLINES

Glenn E. Ullyot, Philadelphia, Pa., assignor to Smith, Kline & French Laboratories, Philadelphia, Pa., a corporation of Pennsylvania No Drawing. Application December 23, 1949, Serial No. 134,869. In Canada April 19, 1949

6 Claims. (Cl. 260—288)

This invention relates to certain new chemical compounds comprising certain aminoalkoxyisoquinoline derivatives which have capacity to produce physiological action and are adapted more particularly for use as local anesthetics.

From the broad standpoint, the chemical compounds contemplated by this invention will have the following structure:

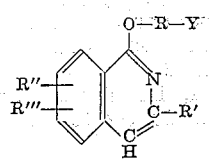

where R is an alkylene group having not in excess of 7 carbon atoms; Y is a nitrogen-linked amino radical selected from the group consisting of, primary amino radicals, secondary amino radicals and tertiary amino radicals, substituents of which are selected from the group consisting of alkyl groups having not in excess of 6 carbon atoms, a benzyl group and a methoxybenzyl group; R' is selected from the group consisting of hydrogen, alkyl groups of not more than 8 carbon atoms, a phenyl and a benzyl group; R'' and R''' are selected from the group consisting of hydrogen, alkyl groups having not in excess of 3 carbon atoms, alkoxyl groups having not in excess of 3 carbon atoms, amino groups, alkylamino groups having not in excess of 4 carbon atoms and acylamino groups having not in excess of 4 carbon atoms.

This invention also contemplates the organic and inorganic salts of the above compounds.

It will be appreciated from the above definition that the compounds contemplated by this invention include the aminoalkoxyisoquinoline derivatives defined above and their organic and inorganic acid salts, which latter will be readily prepared from the former by methods well known to the art using, for example, but not by way of limitation, phosphoric, hydrochloric, hydrobromic, sulfuric, and the like, succinic, benzoic, tartaric, and the like.

As has been indicated, the salts contemplated by this invention will be prepared from the basic compounds, for example, by mixing the basic compounds, which are variously oils, liquids or solids, depending upon the nature of the groups attached to the isoquinoline nucleus, with the organic or inorganic acid desired to be used, either directly or in the presence of a suitable solvent, such as alcohol, water, ether, benzene, or the like. Variously the salt will precipitate directly and can be collected on a filter. In other instances, it will be necessary to remove the solvent by distillation and dry the salt product by warming in vacuo.

Generally speaking, where the compounds in accordance with this invention are used as therapeutic agents, the salts will be preferred for such use.

The starting materials required for the preparation of the compounds in accordance with this invention as defined above are known to the art or may be readily prepared by known methods.

More particularly, the starting materials consist of isoquinoline derivatives represented by the formulae:

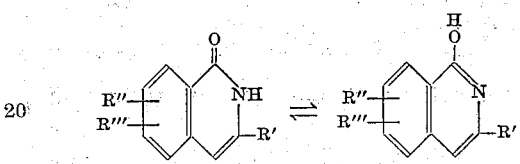

Where R', R'' and R''' are as defined above, and amino alcohols represented by YROH where Y and R are as defined above.

The required isoquinoline derivatives as illustrated by the above formulae may, for example, be prepared according to the methods described in the literature, as, for example, Gabriel and Colman, Ber., 33, 905 (1900) and Gabriel and Newman, Ber., 25, 3569 (1892); and as described in applications for United States patents heretofore filed by me, i. e., Serial No. 116,866, and Serial No. 116,868. The amino alcohols required are well known or the preparation of any particular alcohol required by well known methods will be obvious to those skilled in the art.

Generally speaking, the compounds in accordance with this invention will be prepared by treating the isoquinoline derivatives defined above with, for example, an excess of phosphorus oxychloride to produce the corresponding 1-chloroisoquinoline derivatives and which will have the following structure:

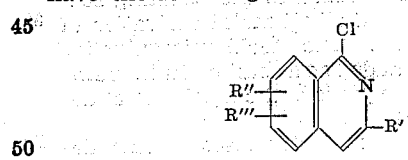

where R', R'' and R''' are as defined above.

This reaction will, for example, be effected by placing the isoquinoline derivatives in a suitable flask, adding one to three molar equivalents of phosphorus oxychloride and heating under a reflux condenser until the evolution of hydrogen chloride ceases. The excess phosphorus oxychloride is then removed by distillation and the product purified by distillation in vacuo, or, alternatively the reaction mixture may be poured into ice water, the mixture neutralized by the addition of alkali and the product isolated by extraction with a solvent, drying and distillation. If desired, this reaction may be carried out in the presence of a solvent, such as benzene, toluene, or the like.

By way of further illustration, the 1-chloroisoquinoline compounds used as starting materials will be prepared from the corresponding isocarbostyrils by the action of phosphorus oxychloride, by the general method, of, for example, Gabriel and Colman, referred to above. By way of example, 56 g. of 3-n-butylisocarbostyril in 86 g. of phosphorus oxychloride is refluxed for 16 hours, cooled and poured into 300 g. of cracked ice. The cold solution is carefully neutralized with sodium hydroxide and the product is extracted with ether. After drying over anhydrous sulfate the ether is removed and the product distilled. This product will boil at 155–158°/6 mm. pressure. The several other isoquinoline compounds will be made in an exactly analogous manner.

As further illustrative, the following 1-chloroisoquinoline compounds may be mentioned.

1-chloroisoquinoline; B. P. 114–116°/9 mm.; M. P. 31° C.
1-chloro-3-methylisoquinoline; B. P. 108–110°/1 mm.; M. P. 32°.
1-chloro-3-ethylisoquinoline; B. P. 148–150°/10 mm.; M. P. 26°.
1-chloro-3-propylisoquinoline; B. P. 157–161°/9 mm.
1-chloro-3-butylisoquinoline; B. P. 155–158°/6 mm.

The preparation of nuclear 1-chloroisoquinoline intermediates will be illustrated and made clear by the following example:

One hundred grams of 6,7-dimethoxy-3-ethylisocarbostyril is dissolved in 190 g. of phosphorus oxychloride and refluxed for 18 hours. The solution is cooled and poured into cracked ice. After neutralization of the decomposed reaction mixture with potassium hydroxide, the product, 1 - chloro-6,7-dimethoxy-3-ethylisoquinoline, is isolated by ether extraction in the usual manner.

The 1-chloroisoquinoline derivatives as defined above having been obtained as described above, the amino alcohol YROH required for the particular compound in accordance with this invention desired to be produced, where Y and R are as given above, dissolved in a suitable solvent such as benzene, toluene, xylene, or the like, is converted into an alkali metal derivative by treatment with a finely divided alkali metal, as, for example, sodium, potassium or lithium, or the like, and the 1-chloroisoquinoline derivative prepared as above is added to the resulting suspension or solution of alkali metal derivative of the amino alcohol. The 1-chloroisoquinoline derivative may be added as a solution in the same solvent as is used to prepare the alkali metal derivative, if desired.

The addition of the 1-chloroisoquinoline derivative is made rapidly or is carried out with stirring and over a period of time suitable for the control of the reaction mixture.

Following the addition of the 1-chloroisoquinoline derivative, the mixture is stirred and heated at a suitable temperature up to the boiling point of the solvent. During the reaction a metal chloride precipitates. On completion of the reaction, the reaction mixture is cooled and filtered to remove the precipitated metal chloride, or this may be removed by washing. The solvent is then removed by distillation and the aminoalkoxyisoquinoline derivative, final product, is purified by distillation in vacuo. Desired purification may be effected by dissolving the reaction product in a suitable solvent, such as dry benzene or dry ether and treating the solution with anhydrous hydrogen chloride. The resulting salt of the product which precipitates may then be collected and crystallized from a suitable solvent.

More particularly with reference to the primary amine compounds in accordance with this invention, i. e., where Y is a primary nitrogen linked amino group, such may be prepared by the procedure above outlined with use of a primary amino alcohol as one of the starting materials. Alternatively, the 1 - (benzylaminoalkoxy) - isoquinoline or 1-(dibenzylaminoalkoxy) - isoquinoline compounds may be prepared and these debenzylated by dissolving in a suitable solvent, as, for example, alcohol, adding two molar equivalents of hydrochloric acid and catalytically reducing in the presence of, for example, 10% palladinized charcoal with hydrogen between say, for example, a pressure of 100 lbs./sq. in. and atmospheric.

As exemplifying isoquinoline derivatives used as starting materials, the following will be illustrative:

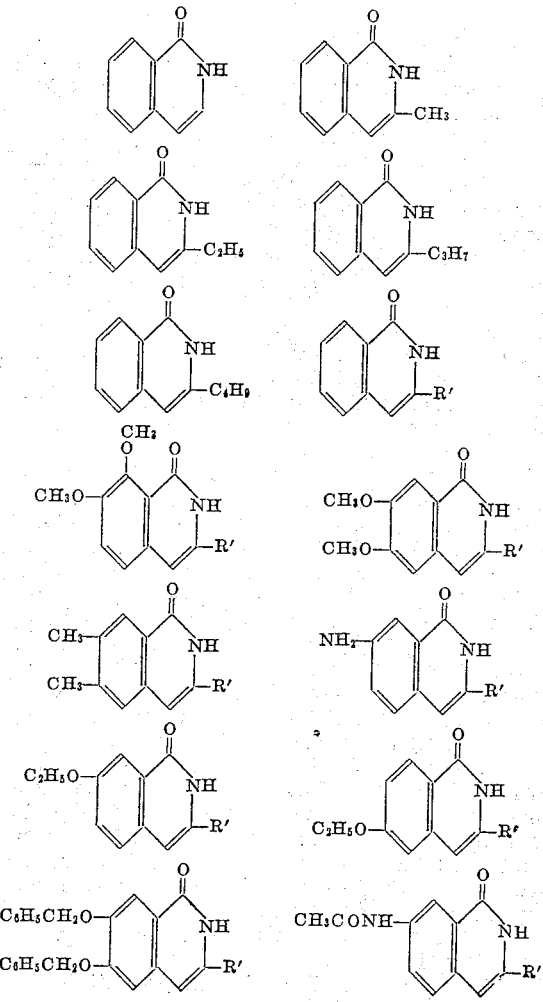

As examples of amino alcohols used as starting materials the following amino alcohols will be illustrative:

2-dimethylaminoethanol
2-diethylaminoethanol
2-dipropylaminoethanol
2-dibutylaminoethanol
2-diamylaminoethanol
2-diethylaminopropanol
3-diethylaminopropanol
2-benzylaminoethanol
2-(cyclohexylethylamino)-ethanol
2-(cyclopentylethylamino)-ethanol
4-diethylaminobutanol
Benzylmethylaminoethanol
Benzylethylaminoethanol
Amylmethylaminoethanol
2-methylaminoethanol
2-ethylaminoethanol
2-propylaminoethanol
2-butylaminoethanol
2-amylaminoethanol
2-hexylaminoethanol
2-cyclohexylaminoethanol
2-cyclopentylaminoethanol
3-ethylaminopropanol
3-propylaminopropanol
3-butylaminopropanol
3-amylaminopropanol
3-hexylaminopropanol
3-cyclohexylaminopropanol
3-cyclopentylaminopropanol
3-benzylaminopropanol
3-methylaminopropanol As examples of specific compounds contemplated by this invention the following structural formulae in which R, R' and Y, where such appear, are as given above, will be illustrative of the various types of compounds within the general formulae A and B contemplated by this invention, and will make all the several compounds contemplated by this invention perfectly apparent:

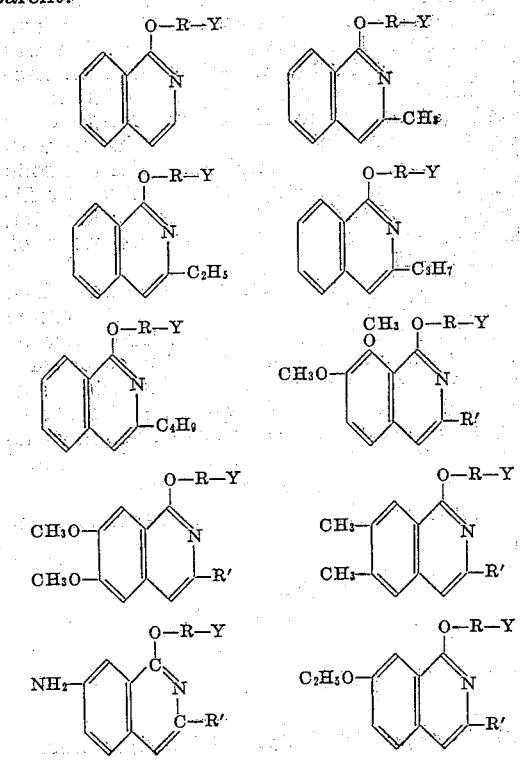

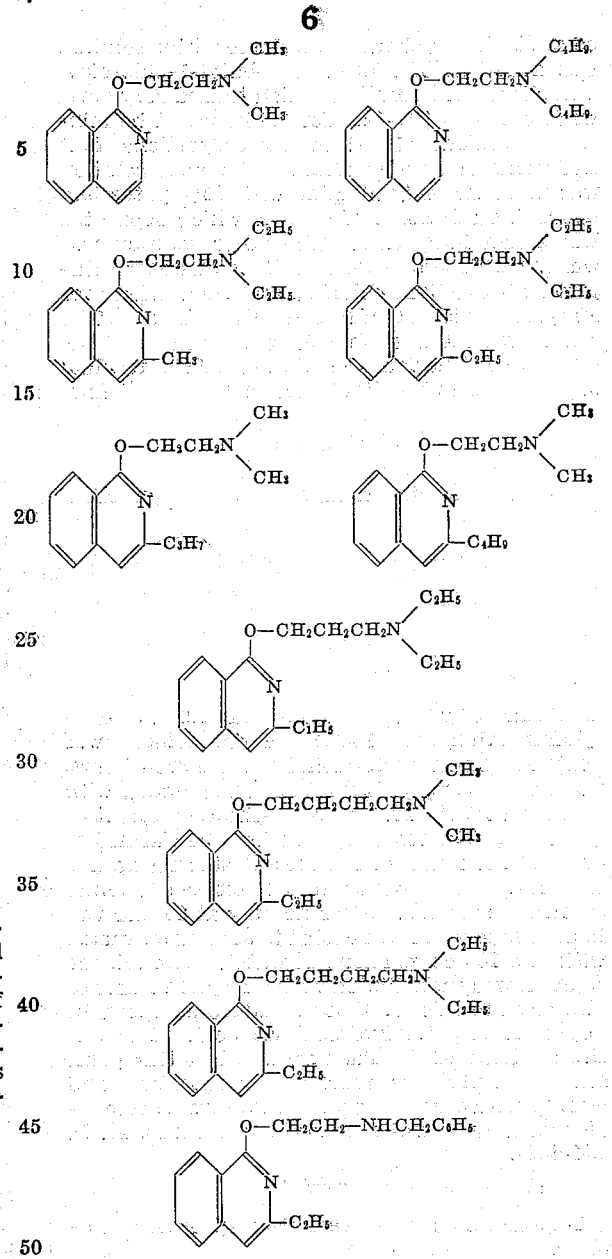

As more specifically illustrative of the preparation of the compounds contemplated by this invention, the following specific examples of the preparation of specific compounds contemplated by this invention will serve to exemplify the preparation of all the several compounds, since all of the several compounds contemplated will be prepared in the same manner with the selection of starting materials required for the production of any particular desired specific compound.

*Example 1*

1-(β-dimethylaminoethoxy)-3-butylisoquinoline.

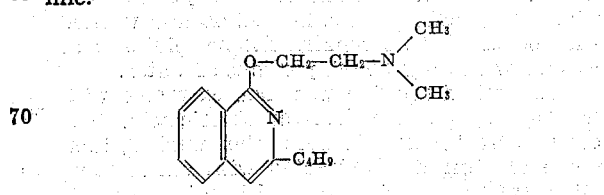

A mixture of 10.0 g. of β-dimethylaminoethanol and 1.9 of sodium in 90 cc. of dry xylene was heated at 95° for five hours. To the resulting solution was added at 30°, 18 g. of 3-butyl-1-chloroisoquinoline. The solution, which turned very dark, was heated at 100–125° for 3.5 hours. The mixture was extracted with two 100 cc. portions of 2N hydrochloric acid solution. The acid solution was made strongly alkaline with 40% potassium hydroxide solution and the oil which separated was taken into ether. The ether solution was washed with two 100 cc. portions of water saturated with sodium chloride, and then dried over anhydrous sodium sulfate for three hours. The sodium sulfate was removed by filtration and the ether by distillation. Distillation of the residual oil gave a colorless liquid, B. P. 155–157°/3 mm.

*Example 2*

1-(β-benzylaminoethoxy)- 3-ethylisoquinoline.

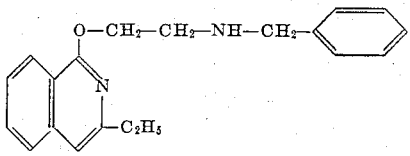

A mixture of 2.3 g. of sodium and 18.0 g. of benzylaminoethanol in 100 cc. of dry toluene was heated at 80–110° with stirring for eleven hours. To the resulting yellow solution was added with stirring at 30°, 19.2 g. of 1-chloro-3-ethylisoquinoline. The resulting solution was warmed to 80° and after fifteen minutes of stirring at this temperature a heavy white precipitate of sodium chloride separated. After heating at 80° for two hours the mixture was cooled to 30° and extracted with two 100 cc. portions of water. The toluene solution was then diluted with an equal volume of ether and to this solution was added an excess of approximately 2N hydrochloric acid. The entire contents of the flask solidified at this point and the solid was removed by filtration and washed with ether. Crystallization from acetone-alcohol gave a white crystalline product, M. P. 154–155°.

*Example 3*

1-(β-dimethylaminoethoxy)- 3 -propylisoquinoline.

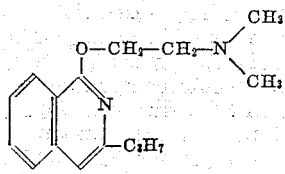

Three and four-tenths grams of sodium was powdered in 100 ml. of dry xylene and reacted with 17.6 g. of β-dimethylaminoethanol. An excess of the aminoethanol was required to react with all of the sodium. During a six hour interval, 26 g. of 1-chloro-3-propylisoquinoline was added. The reaction mixture was kept at 75–85°. The sodium chloride was filtered off and washed with benzene. The benzene-xylene solution was washed with three 50 ml. portions of water.

The washed solution was then extracted with five 30 ml. portions of 2N hydrochloric acid. The combined acid extracts were ether washed, then made alkaline and extracted with ether. The ether solution was washed with saturated salt solution, dried and distilled. The residual oil after ether removal, distilled at 188–190°/4–5 mm.

*Example 4*

1-(β-di-n-butylaminoethoxy) -isoquinoline.

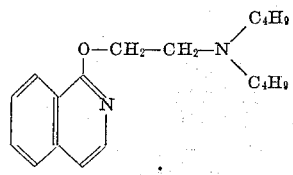

A mixture of 2.53 g. of sodium and 25 g. of di-n-butylaminoethanol, in 100 cc. of dry xylene, was heated at 80–100° with stirring for six hours. An additional 4 cc. of the aminoalcohol was then added and heating just below reflux temperature was continued for two hours. The clear solution was cooled to 30° and 18 g. of 1-chloroisoquinoline was added at once. The mixture was heated at 100–130° for 3.5 hours with stirring. After standing for three days, the mixture was extracted with two 100 cc. portions of water and then with three 150 cc. portions of 2N hydrochloric acid. The combined acid solution was made alkaline with excess 10% potassium hydroxide solution and the oil which formed was taken into ether by three 100 cc. extractions. The ether solution was washed with 100 cc. of a saturated sodium chloride solution and then dried over anhydrous sodium sulfate. The sodium sulfate was removed by filtration and the ether by distillation. The residual oil was vacuum distilled. The product distilled at 172–173°/2 mm.

*Example 5*

1-(β-dimethylaminoethoxy)-3-phenylisoquinoline.

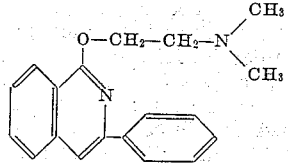

To 1.2 g. of sodium sand suspended in 200 cc. of dry toluene was added 4.5 g. of dimethylaminoethanol and the mixture heated at 90–95° until all of the sodium had reacted. The solution was cooled to 60° and 9.6 g. of 1-chloro-3-phenylisoquinoline was added all at once. The solution was heated just below the reflux temperature for 8 hours and then cooled to 30° and shaken with 100 cc. of 10% hydrochloric acid. The tan solid which formed at this time was separated by filtration, washed with small portions of cold water, dried and recrystallized from 99% isopropanol, M. P. 178.5–179°.

To 10.0 g. of the monohydrochloride was added 50 cc. of 20% sodium hydroxide and the gummy solid which separated was taken into ether by means of three 25 cc. portions. The ether solution was dried over anhydrous magnesium sulfate. After removing the drying agent and solvent, the residual orange oil was distilled in vacuo to give a viscous yellow oil, B. P. 198–200°/1 mm.

*Example 6*

1(β-dimethylaminoethoxy) - 3 - benylisoquinoline.

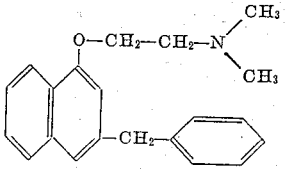

(a) 1-(o-carboxyphenyl)-3-phenylpropanon-1 is prepared from phthalic anhydride and β-phenylethyl bromide according to the procedure used in Example 12(a).

(b) 1 - (o-carbomethoxyphenyl)-3-phenylpropanon-1 is prepared from the product of (a) according to the procedure of Example 12(b).

(c) 1-(o-carbomethoxyphenyl)-3 - phenyl - α - isonitrosopropanon-1 is prepared from the above product by the procedure of Example 12(c).

(d) 1-amino-1-phthalidyl-2-phenylethane hydrochloride is prepared from the product of (c) by the procedure of Example 12(d).

(e) 3 - benzyl-1,2-dihydroisoquinolon-1 is prepared from the product of (d) by the procedure of Example 12(e).

(f) 1-chloro-3-benzylisoquinoline is prepared from the product of (e) and phosphorous oxychloride according to the procedure of Example 12(f).

(g) 1-(β- dimethylaminoethyl) - 3 - benzylisoquinoline is prepared from the product of (f) with dimethylaminoethanol as in the procedure of Example 8.

*Example 7*

1-(2-isopropylamino-isopropoxy) - 3 - ethylisoquinoline.

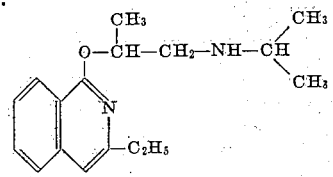

A mixture of 2.3 g. of sodium and 14 g. of 1-isopropylaminopropanol-2 in 80 cc. of sodium-dried toluene was heated at gentle reflux with stirring for one hour. The mixture was then allowed to stand overnight at room temperature. The last traces of sodium were reacted by heating at reflux for an additional three hours. To the resulting yellow solution, 19.2 g. of 1-chloro-3-ethylisoquinoline was added at once (35°). The solution was then heated at 60–80° for two hours and finally at 100–110° for two hours. The resulting mixture was cooled to 30° and extracted with four 100 cc. portions of water. The toluene layer was then extracted with four 100 cc. portions of approximately 2N hydrochloric acid and the acid solution was made basic with an excess of 20% sodium hydroxide solution. The oil which separated was taken into ether by four 100 cc. extractions and the ether solution, after washing with water, was dried over anhydrous magnesium sulfate. The magnesium sulfate was removed by filtration and the ether by distillation. Distillation of the residual oil gave a light yellow oil, B. P. 130–134°/2 mm.

*Example 8*

1-(2-diethylaminopropoxy) - 3 - ethylisoquinoline.

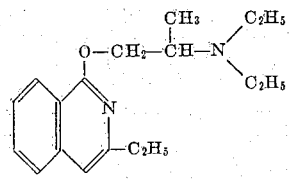

A mixture of 125 cc. of dry xylene and 2.3 g. of sodium was heated at 100° for five minutes and then cooled to 30° with stirring. To this suspension of finely divided sodium in xylene was then added 13.1 g. of β-diethylaminopropyl alcohol. The reaction mixture was maintained at 125–130° for six hours with continual stirring. At the end of that period an additional 2 g. of β-diethylaminopropyl alcohol was added and heating and stirring continued for another two hours. To the cooled solution was added 19.2 g. of 1-chloro-3-ethylisoquinoline. The solution was heated at 120–130° for six hours, cooled and washed with 100 cc. of water and then extracted with three 75 cc. portions of 2N hydrochloric acid. The acidic extractions were made strongly alkaline with 40% sodium hydroxide and the yellow oil which separated was taken into 205 cc. of ether by means of three extractions. After drying the ether solution over anhydrous magnesium sulfate, the drying agent was separated by filtration and the ether removed by distillation under reduced pressure. Vacuum distillation of the residual yellow oil yielded a product, B. P. 185–187°/7 mm.

*Example 9*

1-(1-diethylamino-4-pentoxy)-3-ethylisoquinoline.

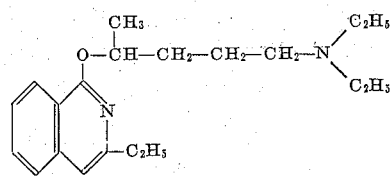

This compound is prepared using a procedure identical with that of Example 10 except that an equimolar amount of 1-diethylamino-4-pentanol is used instead of β-diethylaminopropyl alcohol.

*Example 10*

1-β-aminoethoxy-3-ethylisoquinoline.

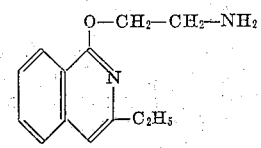

To 125 cc. of dry toluene was added 9.2 g. of ethanolamine and 3.5 g. of sodium. The reaction mixture was heated at 80–90° for six hours, after which an additional amount (ca. 2 g.) of ethanolamine was added. After an additional four hours of heating and stirring at 100–110°, the solution was cooled to 30°. To the cooled solution was added 29.0 g. of 1-chloro-3-ethylisoquinoline. The reaction mixture was warmed to 100–110° when a vigorous reaction occurred with the separation of sodium chloride. The solution was maintained at 100–110° for twelve hours, cooled and washed successively with two 100 cc. portions of water and four 100 cc. portions of 2N hydrochloric acid. The acidic extractions were neutralized with 40% sodium hydroxide and the resultant brown oil which separated was taken into 400 cc. of ether. After drying the ether over anhydrous magnesium sulfate for two hours, the drying agent was removed by filtration and the solvent by evaporation. The residual oil was then distilled in vacuo to yield 1-(2-aminoethoxy)-3-ethylisoquinoline, B. P. 183–188°/1 mm.

*Example 11*

1-[β - (3,4 - dimethoxybenzylamino) - ethoxy]-3-ethylisoquinoline.

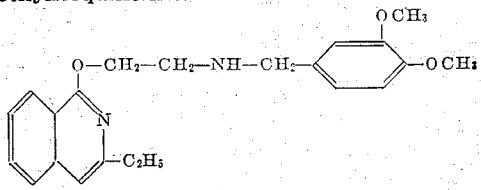

To 2.3 g. of sodium sand suspended in 125 cc. of dry xylene was added 21.1 g. of veratrylaminoethanol. After three hours of heating and stirring the sodium had completely reacted, and the solution was cooled to 30° and 19.2 g. of 1-chloro-3-ethylisoquinoline was added. After maintaining the reaction at 120–30° for seven hours it was cooled to 30°, washed with 100 cc. of water, and then extracted with four 75 cc. portions of dilute hydrochloric acid. The acidic extractions were then made strongly alkaline with 40% sodium hydroxide and the yellow oil which separated was extracted into ether by means of three 100 cc. portions. After drying for three hours over anhydrous magnesium sulfate, the drying agent was separated by filtration and the ether removed by distillation under reduced pressure. Vacuum distillation of the residual orange oil yielded a product, B. P. 120–25°/0.5 mm.

*Example 12*

1 - ($\beta$ - dimethylaminoethoxy) - 3 - ethyl-6,7-dimethylisoquinoline.

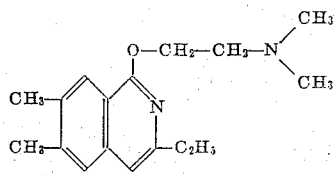

(a) 2-carboxy-4,5-dimethylbutyrophenone was prepared according to the procedure of Ullyot et al., J. Am. Chem. Soc. 70, 542 (1948). To a mixture of 1000 cc. of dry ether and 32.3 g. of magnesium turnings was added a crystal of iodine. This mixture was stirred well and warmed to gentle reflux and then 5–7 cc. of n-propyl bromide was added. In order to initiate the reaction a small quantity of magnesium and propyl bromide (iodine catalyst) were reacted in a test tube and added, causing a vigorous reaction. Cooling the reaction flask in an ice bath, a total of 197 g. of n-propyl bromide was added at such a rate that steady reflux was maintained. When all the magnesium had disappeared the solution was allowed to stand for 45 minutes. It was then cooled in an ice bath and a total of 137.5 g. of anhydrous cadmium chloride was added in small portions in a period of one hour. To the resulting mixture was then added in a period of 30–40 minutes 125 g. of 4,5-dimethylphthalic anhydride. This mixture was refluxed vigorously for 2.8 hours. It was then cooled to 0° and a solution of 80 cc. of concentrated sulfuric acid in 500 cc. of water was added dropwise with stirring. After standing for two days the mixture was filtered to remove the solid at the liquid interface. The ether was separated, the acid layer was washed with ether (200 cc.) and this wash was added to the bulk of the ether solution. The ether solution was then extracted with four 400 cc. portions of water, each of which contained 17 g. of sodium carbonate monohydrate. The alkaline extracts were combined and filtered. The filtrate was acidified with concentrated hydrochloric acid. The product was collected and dried, M. P. 111–119°.

(b) 2-carbomethoxy-4,5-dimethylbutyrophenone was prepared from the product of (a) according to the following procedure. To a solution of 50 g. of 2-carboxy-4,5-dimethylbutyrophenone in 90 cc. of methanol was added a solution of 9.1 g. of sodium hydroxide in 25 cc. of water. The resulting solution was stirred while 28.7 g. of dimethyl sulfate was added dropwise in a period of one hour. The resulting cloudy mixture was stirred at 60° for one hour. An additional 5.7 g. of dimethyl sulfate and 1.3 g. of sodium hydroxide (in 10 cc. of water) was then added at 60°. After an additional hour at 60° with stirring most of the alcohol was removed by distillation under reduced pressure. The yellow oil was then diluted with 300 cc. of water and extracted into 400 cc. of ether (two extractions). The ether solution was extracted with seven 75 cc. portions of an aqueous saturated sodium bicarbonate solution. After drying overnight over anhydrous sodium sulfate the ether was removed from the ester solution by distillation and the ester was distilled at a pressure of 3.0–3.5 mm.; B. P. 155.8–158°.

(c) 2 - carbomethoxy - 4,5 - dimethyl - $\alpha$ - isonitrosobutyrophenone was prepared from the product of (b) as follows: To a well-cooled solution (0°) of 11.7 g. of 2-carbomethoxy-4,5-dimethylbutyrophenone in 25 cc. of methylene chloride was added dropwise (20 minutes) with stirring a solution of 6.0 g. of ethyl nitrite in 25 cc. of methylene chloride. When the addition was complete dry hydrogen chloride gas was passed into the solution at the rate of 3–6 bubbles per second for 20 minutes. Cooling and stirring was continued and rate of addition of hydrogen chloride was then kept at 10–15 bubbles per second for 60 minutes. This gave a deep red solution which was very nearly saturated with hydrogen chloride. After 1.5 hours at 10° the methylene chloride was removed by evaporation under reduced pressure. The green tinted solid which remained was crystallized from dilute alcohol to give a white crystalline solid; M. P. 136–142°. Repeated crystallization from 90% isopropanol gave an analytical sample melting at 154–157°.

(d) 1 - amino - 1 - (5,6 - dimethylphthalidyl) - propane hydrochloride was prepared from the product of (c) in the following manner: A solution of 38 g. of 2-carbomethoxy-4,5-dimethyl-$\alpha$-isonitrosobutyrophenone in 400 cc. of alcohol which contained 38 cc. of concentrated hydrochloric acid, 10 cc. of 16% palladium chloride solution, and 2 g. of decolorizing carbon, was hydrogenated at an initial pressure of 500 lb./in. and a temperature of 42°. Within four hours the reduction was 75% complete. After standing overnight, fresh catalyst was added and the reduction was continued for an additional four hours. The reduction mixture was heated to 60°, filtered to remove the catalyst, and then diluted with 30 cc. of water. After cooling to 0°, 8.5 g. of a crystalline solid was separated by filtration. The filtrate was taken to dryness in vacuo and the white solid which remained was triturated with 250 cc. of cold acetone. The insoluble white solid was separated by filtration and washed with cold acetone. The acetone filtrate was taken to dryness in vacuo and the white paste which remained was shaken with 200 cc. of water. The brown flocculent solid which remained was separated by filtration and washed with water. The two previously obtained solids were shaken with 200 cc. of water, and the white insoluble material was again separated by filtration and washed with water, M. P. 269–278°. The aqueous filtrates were combined and the water was removed by distillation under reduced pressure. The yellow crystalline solid which remained was shaken with 200 cc. of 50–50 ether-acetone mixture and separated by filtration. It melted at 286–289° C. To a suspension of the salt so obtained in a mixture of 20 cc. of methylene chloride and 30 cc. of water (0°) was added dropwise, with good cooling and stirring, a solution of 2.8 g. of sodium hydroxide in 10 cc. of water. The resulting sludge was extracted with 40 cc. of chloroform and then with an additional 40 cc. of chloroform. The combined chloroform solution was shaken with solid sodium bicarbonate and dried over anhydrous sodium sulfate for 40 minutes. The solution was clarified by filtration through a mat of decolorizing carbon and approximately three-quarters of the solvent was removed by evaporation under reduced pressure. To the yellow solution which remained was added 25 cc. of absolute alcohol containing 4.5 g. of anhydrous hydrogen chloride. The white pasty hydrochloride which formed was stirred with 200 cc. of ether and filtered. It was dried overnight in the vacuum desiccator, M. P. 288–290°.

(e) 3 - ethyl - 6,7 - dimethyl - 1,2 - dihydroisoquinolon-1 was prepared by dissolving 6.9 g. of 1 - amino - 1 - (5,6 - dimethylphthalidyl) - propane hydrochloride (prepared in (d) above) in 50 cc. of water to which was added a solution of 2.2 g. of sodium hydroxide in 10 cc. of water. The resulting solution was refluxed for seven hours and allowed to stand overnight. Collection of the solid which separated followed by recrystallization from a mixture of alcohol and water gave a product melting at 198–190° C. 3.5 g. of this compound, 3-ethyl-6,7-dimethyl-4-hydroxy-1,2,3,4-tetrahydroisoquinolon-1, was dehydrated to the corresponding dihydroisoquinolon-1 by dissolving it in 35 cc. sulfuric acid and heating the resulting solution for one hour on the steam bath. The acid solution was poured onto ice and the resulting precipitate was collected and crystallized from 99% isopropanol, M. P. 248–249° C.

(f) 1 - chloro - 3 - ethyl - 5,6 - dimethylisoquinoline was prepared by treating 48 g. of the dihydroisoquinolon prepared in (e) with 10 g. of phosphorous oxychloride according to the general procedure described by Wilson, Dawson, Brooks, and Ullyot, J. Am. Chem. Soc. 71, 937 (1949). After refluxing the reactants for four hours, the resulting solution was poured onto ice and the mixture made alkaline with 40% sodium hydroxide. The oil which separated was taken into ether and dried over magnesium sulfate. After removal of the drying agents and the ether, the product distilled at 155–156° C. at 25 mm.

(g) 1 - dimethylaminoethoxy-3-ethyl-6,7-dimethylisoquinoline was prepared by reacting 1-chloro-3-ethyl-5,6-dimethylisoquinoline prepared in (f) with dimethylaminoethanol according to the procedure of Example 10. The resulting product distilled at 174–175° C. at 3 mm.

*Example 13*

1 - (β - dimethylaminoethoxy) - 3 - ethyl-7,8-dimethoxyisoquinoline.

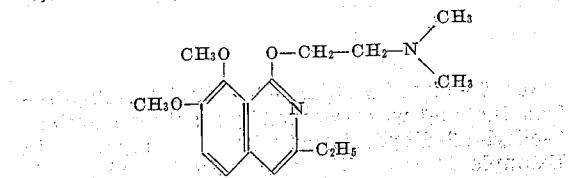

(a) 1 - amino - 1 - (6,7-dimethoxyphthalidyl) - propane was prepared according to the general procedure described by Ullyot et al., J. Org. Chem. 10, 429 (1945).

15 g. of opianic acid and 6.32 g. of 1-nitropropane was suspended in 100 cc. of water in a reaction vessel surrounded with an ice bath. The solution was rapidly stirred and 11.9 cc. of 40% NaOH was added dropwise while the temperature was maintained at 3° C. The reactants gradually dissolved. After about 3 hrs. at 3° C. the solution was acidified by careful addition of 30 cc. of 6N HCl, the temperature being maintained below 10° C. After 14 hrs., the crystalline precipitate which formed was collected and washed with NaHCO₃. Crystallization from an alcohol-water mixture gave colorless crystals (which melted in the range of 101–106° C.) of 1-nitro-1-(6,7-dimethoxyphthalidyl)-propane.

3.5 g. of the above nitro compound was dissolved in 150 cc. of alcohol and 1 g. of 10% palladized carbon and 2.5 cc. of concentrated HCl was added, and reduction was carried out in a Burgess Parr apparatus at an initial hydrogen pressure of 50 lbs./sq. in. at 50° C. The catalyst was removed by filtration and the solvent was removed by distillation. Benzene was added and removed by distillation to remove moisture. The residue was dissolved in 50 cc. of warm acetone, petroleum ether was added until an oil began to precipitate and this was brought back into solution by the addition of a small amount of acetone. On standing, the solution deposited a crystalline precipitate which was collected and washed with benzene and acetone. The crystals were dissolved in 50 cc. of alcohol and treated with carbon. 250 cc. of benzene was added and distillation was carried out at atmospheric pressure until the solution was concentrated to 100 cc. Finally, the solution was concentrated to 30 cc. by distillation in vacuo. On addition of 75 cc. of acetone and cooling, colorless crystals of 1-amino-1-(6,7-dimethoxyphthalidyl)-propane hydrochloride was obtained.

(b) 3 - ethyl - 7,8 - dimethoxy - 1,2 - dihydroisoquinolon-1 was prepared from the product of (a) according to the procedure of Example 12 (e).

(c) 1 - chloro - 3 - ethyl - 6,7 - dimethoxyisoquinoline was prepared from the product of (b) using the procedure of Example 12 (f).

(d) 1 - (β - dimethylaminoethoxy) - 3 - ethyl-7,8-dimethoxyisoquinoline was prepared from the product of (c) using the procedure of Example 8.

*Example 14*

1 - (β - dimethylaminoethoxy) - 3 - ethyl - 7 - aminoisoquinoline.

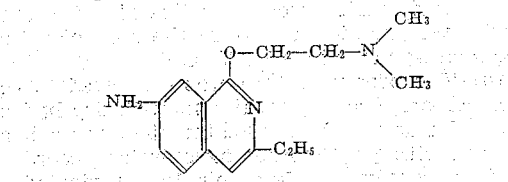

(a) 3 - ethyl - 7 - amino - 1,2 - dihydroisoquinolon-1 was prepared by the rearrangement of 1 - amino - 1 - (6 - aminophthalidyl) - propane dihydrochloride, which in turn was prepared by the reduction of 1-(6-nitrophthalidyl)-1-nitropropane as described below. This starting material, the dinitrophthalidylpropane, in turn was prepared in the following manner, using generally the procedure of Shriner and Keyser (J. Org. Chem. 5, 200 (1940).

A solution of 22.1 gms. of 1-nitro-1-phthalidylpropane melting at 94–96° C. in 20 ml. of concentrated sulfuric acid was added dropwise with stirring to a mixture of 11 gms. of potassium nitrate and 33 ml. of concentrated sulfuric acid, the reaction temperature being maintained lower than 5° C. After stirring for three hours at less than 10° C., the mixture was allowed to stand at room temperature for 16 hours and poured over cracked ice. The granular solid which separated was filtered and dried and melted at 93–96° C. Recrystallization from alcohol provided a product melting at 95–98° C.

30 gms. of the above dinitrophthalidylpropane was reduced using 160 cc. of glacial acetic acid and 0.1 gm. of platinum oxide at a temperature of 60–80°. 100% of the theoretical volume of hydrogen corresponding to the reduction of one nitro group was taken up in a period of 10 minutes, after which further absorption of hydrogen was very slow. The hot solution was removed, filtered and cooled, whereupon a light orange product was separated by filtration, which melted at 178–181° C. Further purification by refluxing in alcohol and butanone followed by distillation yielded a purer product of 1-(6-aminophthalidyl)-1-nitropropane, melting at 182–184° C.

113 gms. of 1-nitro-1-(6-aminophthalidyl)-propane was reduced using a saturated aqueous solution containing one equivalent of hydrochloric acid under 50 pounds per square inch pressure of hydrogen at 60° C. using a palladium-on-carbon catalyst. After removal of the catalyst the combined aqueous solution containing 1-amino-1-(6-aminophthalidyl)-propane dihydrochloride was made definitely alkaline by the addition of excess 40% sodium hydroxide solution to effect rearrangement to the corresponding isoquinolon. The resulting mixture was heated at 90° C. under vacuum and 1.5 liters of water was slowly distilled for a period of six hours. Heating was then continued for a period of 5 hours removing an additional 250 cc. of water. The dark mixture was then cooled to 10° and the solid was removed by filtration. The dark filtrate was then acidified and further filtered to remove additional salt, and cooled over a long period of time. The yield was a white crystalline powder product of 7-amino-3-ethyl-4-hydroxy-1,2,3,4-tetrahydroisoquinolon-1 which melted at 216–217° C.

A solution of 21 g. of crude 7-amino-3-ethyl-4-hydroxy-1,2,3,4-tetrahydroisoquinolon-1 in 64 cc. of concentrated sulfuric acid was heated at 80–90° for 1.5 hours. It was then cooled to 30° and poured into 250 gms. of cracked ice. The resulting solution being made alkaline with 40% sodium hydroxide, a tan solid formed which was removed by filtration, washed with water, and dried at 45°, which product melted at 195–197° C. Three recrystallizations from the alcohol raised the melting point to 202–203° C.

(b) The product of (a) was converted to the hydrochloride salt by treatment with dry hydrogen chloride in ether. Treatment of the salt so formed with phosphorous oxychloride according to the procedure of Example 12 (f) yielded 7-amino-1-chloro-3-ethylisoquinoline.

(c) 7 - amino-1-(β-dimethylaminoethoxy)-3-ethylisoquinoline was prepared from product of (b) using dimethylaminoethanol according to the procedure in Example 8.

Example 15

1 - (β - dimethylaminoethoxy)-3-ethyl-7-acetylaminoisoquinoline.

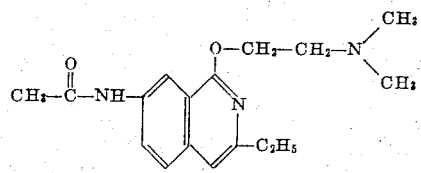

(a) 7 - acetylamino - 3 - ethyl-1,2-dihydroisoquinolon-1 was prepared by diluting with 5 cc. of water, a solution of 1 gm. of 7-amino-3-ethyl-1,2-dihydroisoquinolon-1 (prepared as an intermediate in Example 14 (a)) in 5 cc. of warm glacial acetic acid. The resulting solution was cooled to 35° and 0.8° (.008 n.) of acetic anhydride was added. The resulting solution was shaken intermittently for 2.1 hours at room temperature, diluted with 5 cc. of water and cooled to 5°. Separation of the product is accomplished by filtration, followed by washing with water and drying. The resulting material melted at 274–277° C. Crystallization from acetic acid and water gave an almost white product which melted at 276–278° C.

(b) 7 - acetylamino-1-chloro-3-ethylisoquinoline was prepared from the product of (a) and phosphorous oxychloride by the procedure of Example 12 (f).

(c) 7 - acetylamino - 1 - (β - dimethylaminoethoxy)-3-ethylisoquinoline was prepared from the product of (b) with dimethylaminoethanol according to the procedure of Example 8.

Example 16

1-(β - dimethylaminoethoxy)-3-ethyl-7-methylaminoisoquinoline

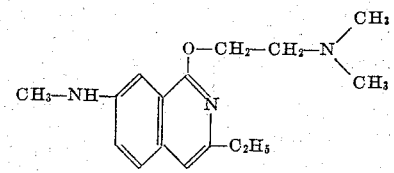

(a) 7 - methylamino - 3-ethyl-1,2-dihydroisoquinolon-1 was prepared by reacting 7-amino-3-ethyl-1,2-dihydroisoquinolon-1, prepared as an intermediate in Example 14 (a), with benzaldehyde to form a Schiff's base, and treating the product with methyl iodide according to the procedure of Decker and Becker, Annalen 395, 362 (1913) (cf. Hamilton and Robinson J. C. S. 109, 1033 (1916)).

(b) 7 - methylamino - 1 - chloro - 3 - ethylisoquinoline was prepared by treatment of the hydrochloride salt of the product of (a) with phosphorous oxychloride following the procedure of Example 12 (f).

(c) 1 - (β - dimethylaminoethoxy)-3-ethyl-7-methylaminoisoquinoline was prepared from the product of (b) and dimethylaminoethanol using the procedure of Example 8.

Example 17

1-(β - dimethylaminoethoxy) - 3 - ethyl-7-dimethylaminoisoquinoline.

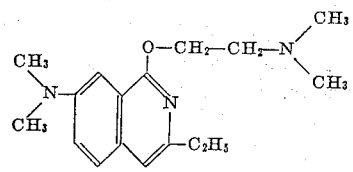

(a) 7 - dimethylamino - 3 - ethyl-1,2-dihydroisoquinolon-1 was prepared by reacting 7-amino-3-ethyl-1,2-dihydroisoquinolon-1 (prepared in Example 14 (a) with formaldehyde and formic acid according to the procedure of Clark et al., J. Am. Chem. Soc. 55, 4571 (1933)).

(b) 7 - dimethylamino - 1 - chloro-3-ethylisoquinoline was prepared by treatment of the product of (a) with phosphorous oxychloride, following the procedure of Example 12 (f).

(c) 1 - (β - dimethylaminoethoxy)-3-ethyl-7-dimethylaminoisoquinoline was prepared from the product of (b) and dimethylaminoethanol using the procedure of Example 8.

Following the procedure given in the above specific examples, the following compounds in accordance with this invention will be prepared:

1-(β-dimethylaminoethoxy)-isoquinoline; B. P. 133–4°/2 mm.
1 - (β-dibutylaminoethoxy)-isoquinoline; B. P. 172–173°/2 mm.
1 - (β - diethylaminoethoxy)-3-methylisoquinoline; B. P. 153–4°/2 mm.
1 - (β-diethylaminoethoxy)-3-ethylisoquinoline; B. P. 154–7°/1 mm.
1-(β-piperidinoethoxy)-3-ethylisoquinoline; B. P. 175–8°/1 mm.
1 - (β-diethylaminopropoxy)-3-ethylisoquinoline B. P. 166–9°/4 mm.

It will be understood that the various particular starting materials requisite for the preparation of the various compounds included within the above general formulae A and B and contemplated by this invention are known, or, as has been clearly pointed out, they may be readily prepared by known procedure. The several compounds within the above general formulae A and B and contemplated by this invention will be prepared from the starting materials indicated by the procedure generally outlined and specifically exemplified above, all of which will be apparent to those skilled in the art.

This is a continuation-in-part of my application, Serial No. 45,432, filed August 20, 1948.

What is claimed is:

1. A compound of the class consisting of a free base and its organic and inorganic acid addition salts, said free base having the formula:

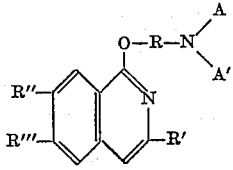

in which A is selected from the group consisting of hydrogen, alkyl groups having not in excess of 6 carbon atoms, phenyl lower alkyl groups and lower alkoxy phenyl lower alkyl groups; A' is selected from the group consisting of alkyl groups having not in excess of 6 carbon atoms, phenyl lower alkyl groups and lower alkoxy phenyl lower alkyl groups; R is an alkylene group having not in excess of 7 carbon atoms; R' is selected from the group consisting of alkyl groups having not in excess of 8 carbon atoms, phenyl and benzyl radicals; R'' and R''' are selected from the group consisting of hydrogen, alkyl groups having not in excess of 3 carbon atoms, alkoxy groups having not in excess of 3 carbon atoms, amino groups, alkylamino groups having not in excess of 4 carbon atoms and acylamino groups having not in excess of 4 carbon atoms.

2. 1-(β - dimethylaminoethoxy) - 3 - butylisoquinoline

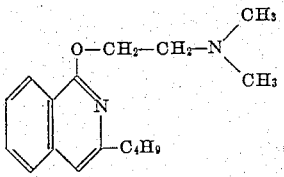

3. The compound 1-(β-dimethylaminoethoxy)-3-propylisoquinoline having the following structure:

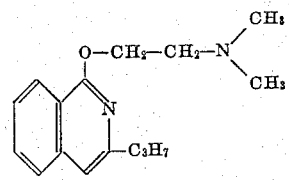

4. The compound 1-(1-diethylamino-4-pentoxy)-3-ethyl-isoquinoline having the following structure:

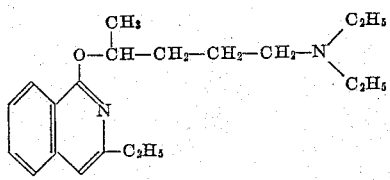

5. The compound 1-(β-dimethylaminoethoxy)-3-ethyl-7-aminoisoquinoline having the structure:

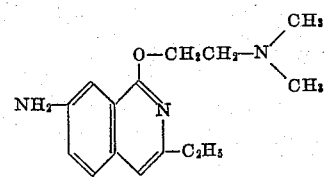

6. The compound 1-(β-dimethylaminoethoxy)-3-ethyl-7-dimethylaminoisoquinoline having the following structure:

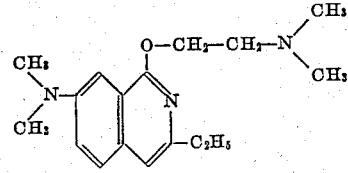

GLENN E. ULLYOT.

REFERENCES CITED

The following references are of record in the file of this patent:

UNITED STATES PATENTS

| Number | Name | Date |
| --- | --- | --- |
| 1,572,768 | Callsen | Feb. 9, 1926 |
| 1,587,073 | Hahl | June 1, 1926 |
| 1,860,286 | Hartmann et al. | May 24, 1932 |
| 1,891,980 | Hartmann et al. | Dec. 27, 1932 |

OTHER REFERENCES

Fellows et al.: Fed. Proc., vol. 8, p. 291 (March 1949).

Wilson et al.: J. Am. Chem. Soc., vol. 71, pp. 937–938 (1949).